United States Patent [19]

Kobayashi et al.

[11] 4,230,146
[45] Oct. 28, 1980

[54] FUEL FEED SYSTEM

[75] Inventors: Hiroto Kobayashi, Kamakura; Tsuneo Hashimoto, Shakujii, both of Japan

[73] Assignee: Walbro Far East, Inc., Kawasaki City, Japan

[21] Appl. No.: 938,766

[22] Filed: Sep. 1, 1978

[30] Foreign Application Priority Data

Sep. 10, 1977 [JP] Japan .................. 52-109053

[51] Int. Cl.³ .......................................... F16K 31/165
[52] U.S. Cl. ...................................... 137/494; 137/565; 137/DIG. 9; 417/295
[58] Field of Search ............... 137/494, DIG. 9, 565; 417/295

[56] References Cited

U.S. PATENT DOCUMENTS

| 2,059,042 | 10/1936 | Schweller | 137/494 X |
|---|---|---|---|
| 2,132,130 | 10/1938 | Sallot | 417/295 X |
| 2,282,413 | 5/1942 | Zoder | 417/295 X |
| 2,946,340 | 7/1960 | Hollman | 137/DIG. 9 |
| 3,994,357 | 11/1976 | Smitley | 137/494 X |
| 3,994,358 | 11/1976 | Smitley | 417/295 X |
| 4,054,116 | 10/1977 | Coddington | 417/295 X |

FOREIGN PATENT DOCUMENTS

| 1103799 | 3/1961 | Fed. Rep. of Germany | 137/DIG. 9 |
|---|---|---|---|
| 974814 | 5/1961 | Fed. Rep. of Germany | 137/DIG. 9 |

*Primary Examiner*—Robert G. Nilson
*Attorney, Agent, or Firm*—Barnes, Kisselle, Raisch & Choate

[57] ABSTRACT

A fuel feed system having a fuel tank and a pump for pumping up fuel from said fuel tank and for feeding the same to a combustor, characterized in that there is provided between said fuel tank and said pump, a negative pressure actuating valve which is closed against fuel pressure in said fuel tank but opened by a negative pressure created by said pump.

5 Claims, 1 Drawing Figure

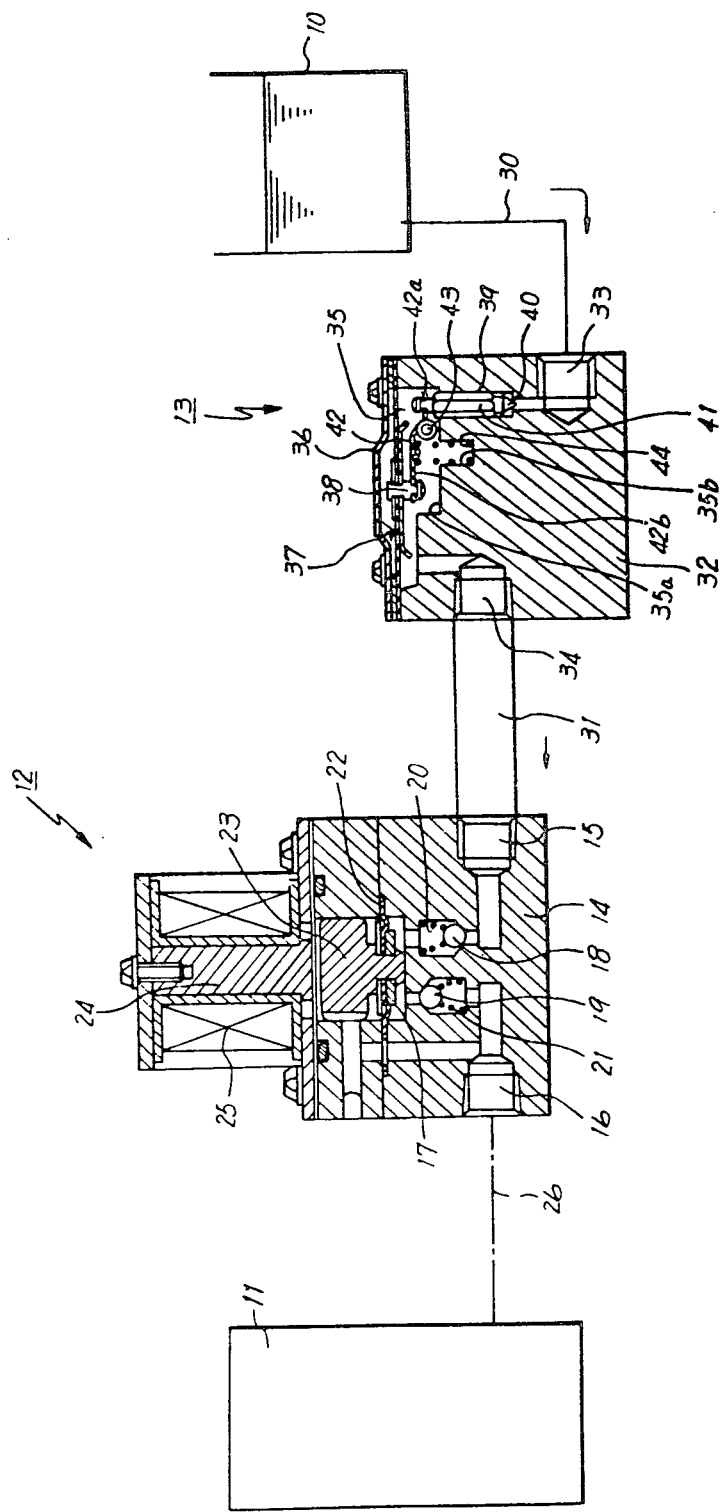

FUEL FEED SYSTEM

DETAILED DESCRIPTION OF THE INVENTION:

This invention relates to a fuel feed system for a combustion apparatus.

In order to attain a stable combustion in heaters, heating apparatus, fuel is generally required to be stably fed thereto no matter how it is subjected to variation in ambient temperature or pressure and the like in a combustion chamber.

The prior art has heretofore proposed to provide fuel feed systems of these classes in which a fixed flow rate valve relying on a head or a displacement type fixed flow rate pump is employed. The former has a difficulty in compensation for variation of pressure in the combustion chamber and in control of such pressure and is thus liable to incur accidents such as fire, detonation or the like. On the other hand, the latter is at a disadvantage in limitation of a tank arrangement and a pipe arrangement since it is designed to always feed fuel from a downwardly disposed tank so that a separated tank or an upwardly disposed tank cannot be used.

It is, therefore, a primary object of the present invention to provide a new and useful fuel feed system quitely safe from accidents, which is capable of not only disposing a fuel tank at any location, and feeding fuel in a fixed quantity but also automatically cutting off the feed of fuel in case of accidents or troubles.

A single FIGURE accompanies this disclosure and is a schematic representation of a fuel feed system of the present invention partly in section.

Now, the present invention will be explained by an embodiment thereof with reference to the accompanying drawing.

In a single FIGURE, a fuel feed system in which the present invention is embodied, is shown as a whole. The fuel feed system comprises a fuel tank 10, a pump 12 for pumping up fuel from the fuel tank 10 and for feeding the same to a combustor 11, and a negative pressure actuating valve 13. The pump 12 is in the form of, for instance, a diaphragm pump and includes a main body 14. The main body has an inlet port 15, an outlet port 16, and a pump room 17 arranged therebetween to communicate therewith. The inlet port 15 and the outlet port 16 are provided with an inlet valve 18 and an outlet valve 19, respectively, which are so urged by springs 20, 21 as to normally close the inlet and outlet ports. A diaphragm 22 is arranged upwardly of the pump room 17 to transverse the latter and rigidly secured to the main body 14 in a desired manner. More specifically, the central portion of the diaphragm 22 is rigidly mounted on a movable iron core 23 at the lower end thereof. The movable iron core 23 is in turn so mounted in the main body 14 as to be vertically moved therein. A stator iron core 24 is positioned upwardly of the movable iron core to face it and includes a coil 25 disposed around the stator iron core. With this arrangement, an interrupted application of current from the power source (not shown) to the coil provides an intermittent magnetic attraction for the stator iron core, thereby vertically moving the movable iron core. This allows the central portion of the diaphragm to be vertically moved. The outlet port 16 is connected by a supply pipe 26 to the combustor 11.

The negative pressure actuating valve 13 includes a main body 32 which is provided at opposite sides thereof with an inlet port 33 and an outlet port 34. The inlet port 33 is coupled by an oil feed pipe 30 to the fuel tank, and the outlet port 34 is in turn connected by a connecting pipe 31 to the inlet port 15 in the diaphragm pump 12. A pressure regulating chamber 35 is formed upwardly of the main body 32 to communicate with the inlet and outlet ports 33, 34. The top of the pressure regulating chamber 35 is covered with a convexed cover member 36. A diaphragm 37 is adapted to fix its periphery to the main body 32 on the margin of the cover member 36. The cover member 36 is provided with suitable apertures to apply atmospheric pressure to the diaphragm 37 at one side thereof reversed to the other side facing the pressure regulating chamber 35. Rigidly mounted on the substantially central portion of the diaphragm 37 is a metal fitting 38 for carrying one end of a connecting rod as described hereinafter.

A passage 39 is vertically formed in the main body 32 and between the pressure regulating chamber 35 and the inlet port 33 to communicate therewith. A valve socket 40 is formed downwardly of the passage 39. The pressure regulating valve 41 is received in the passage 39 and rests on the socket 40. The connecting rod 42 is designed to connect its one end 42a to the upper end of the pressure regulating valve 41. A pivot pin 43 is horizontally disposed on the inner wall of the pressure regulating chamber 35 to pivotally support the connecting rod 42 at its suitable portion adjacent the pressure regulating valve 41. The other end 42b of the connecting rod 42 is a rigidly mounted on the metal fitting 38 secured to the center of the diaphragm 37. A pressure regulating valve spring 44 is positioned between the other end 42b of the connecting rod 42 and the pivot pin 43 and has its upper end engaged with the connecting rod 42 and its lower end held in a cylindrical groove 35b formed in the bottom surface 35a of the chamber 35. Thus, the pressure regulating valve spring 44 normally acts in the direction of upwardly urging the diaphragm 37. One end 42a of the connecting rod 42 is then downwardly depressed under action of the pivot pin 43 to energize the pressure regulating valve 41 to be in close contact with the socket 40. For this reason, the inlet port 33 is closed to cut off the supply of fuel from the fuel tank 10. The bias of the pressure regulating valve spring 44 is set enough to allow the pressure regulating valve to close the inlet port 33 against fuel pressure applied thereto.

The mode of operation of the instant system will be apparent from the following description.

When the current is initially applied to the coil 25 to raise the movable iron core 23 as well as the diaphragm 22 to render the pressure in the pump room 17 negative, the inlet valve 18 is thus opened to render the pressure in the pressure regulating chamber 35 negative. As a result, the diaphragm is downwardly deformed to upwardly move the pressure regulating valve 41 to open the inlet port 33 so that fuel flows through the oil feed pipe 30, inlet port 33, pressure regulating chamber 35, connecting pipe 31, and the inlet port 15 and into the pump room 17. Fuel in a fixed quantity within the pump room is pressurized by the diaphragm 22 when the movable iron core 23 is lowered. Then, fuel forces the outlet valve 19 open (at this time the inlet valve 18 is closed) and passes through the outlet port 16 and supply pipe 26 and is then fed to the combustor 11. On the other hand, when the pressure in the pressure regulating chamber 35 is raised by flow of fuel thereinto, the sensible diaphragm 37 is upwardly restored to its original configuration so that the connecting rod end 42b is upwardly moved whereas the other rod end 42a is lowwered. Consequently, the pressure regulating valve 41 connected to the outer rod end 42a is again in close contact with the valve socket 40 to involve a closed condition, thereby cutting off the supply of fuel from the fuel tank 10. A further actuation of the diaphragm pump 12 admits of repetition of the aforementioned operation. In this manner, fuel can be fed from the pump 12 to the combustor 11 at a predetermined pressure.

According to the present invention, provided between the tank and the pump is the negative pressure actuating valve which is adapted to be normally closed but opened only when the pressure is negative by the pump. With this arrangement, the pressure in the pump inlet is always held constant and fuel is fed in a stable manner at any time even if the fuel tank is upwardly positioned. There is no inadvertent flow of fuel from the inlet and outlet valves due to release of the latter under fuel pressure. Further, a backward flow of fuel is efficiently prevented even if the fuel tank is downwardly disposed. In addition, fuel never flows out in case of breakage of the diaphragm of the negative pressure actuating valve since the pressure regulating valve is held in a closed condition under action of the spring for the pressure regulating valve. Moreover, an air lock phase which may be often occurred when the system is started, can be avoided. In accordance with the present invention, there is provided a fuel feed system which is fabricated in a simple and compact structure without use of any auxiliary tank or fixed level gauge and which has the highest degree of freedom for design.

We claim:

1. In a liquid fuel system having a fuel tank, a fuel pump for supplying liquid fuel from the tank to a combustor, and a fuel control assembly between the tank and pump with the control assembly having a regulating chamber, an inlet to the chamber communicating with an outlet of the fuel tank, an outlet from the chamber communicating with an inlet of the pump, and a diaphragm in sealed relation with the chamber and having one face communicating with the atmosphere, and an opposed face communicating with the interior of the chamber and liquid fuel therein, the improvement in said control assembly comprising a valve between the chamber and the inlet to the chamber, said valve being movable to opened and closed positions to control the flow of fuel from the tank into the chamber and constructed and arranged to be urged toward its opened position by a force produced on the valve by fuel from the tank, means operably connecting the diaphragm with said valve and constructed and arranged so that atmospheric pressure acting on said diaphragm urges said valve toward its opened position and fuel in the chamber acting on said diaphragm urges said valve toward its closed position, and yieldable means constructed and arranged to urge said valve toward its closed position with sufficient force to overcome the bias of said diaphragm and fuel from the tank to close said valve when the pump is inoperative while permitting said valve to open when the pump is operating, due to a decrease in the force produced by the fuel in the chamber acting on said diaphragm.

2. The improvement of claim 1 wherein said yieldable means comprises a spring.

3. The improvement of claim 1 wherein said means operably connecting said diaphragm with said valve, comprises a lever arm.

4. The improvement of claim 3 wherein said yieldable means comprises a spring.

5. The improvement of claim 1 wherein said means operably connecting said diaphragm with said valve, comprises a lever arm operably connected with both said diaphragm and said valve, and said yieldable means comprises a spring operably associated with said lever arm.

* * * * *